(12) United States Patent
Chen et al.

(10) Patent No.: US 9,054,976 B2
(45) Date of Patent: Jun. 9, 2015

(54) NETWORK CONFIGURATION SYSTEM BASED ON LOCATION AND CONFIGURATION METHOD THEREOF

(71) Applicant: MOXA INC., New Taipei (TW)

(72) Inventors: You Shih Chen, Zhongli (TW); Ming Huang Ling, New Taipei (TW)

(73) Assignee: MOXA INC., New Taipei (TW)

( * ) Notice: Subject to any disclaimer, the term of this patent is extended or adjusted under 35 U.S.C. 154(b) by 323 days.

(21) Appl. No.: 13/778,115

(22) Filed: Feb. 27, 2013

(65) Prior Publication Data

US 2014/0244810 A1   Aug. 28, 2014

(51) Int. Cl.
*H04L 12/24* (2006.01)
*H04L 12/751* (2013.01)
*H04L 29/12* (2006.01)

(52) U.S. Cl.
CPC .............. *H04L 41/12* (2013.01); *H04L 45/02* (2013.01); *H04L 61/00* (2013.01); *Y02B 60/43* (2013.01)

(58) Field of Classification Search
CPC ......... Y02B 60/43; H04L 41/12; H04L 67/16
See application file for complete search history.

(56) References Cited

U.S. PATENT DOCUMENTS

2008/0186875 A1* 8/2008 Kitani ............................ 370/254
2013/0275566 A1* 10/2013 Huth et al. .................... 709/220

* cited by examiner

*Primary Examiner* — Chirag R Patel
(74) *Attorney, Agent, or Firm* — Chih Feng Yeh; Huntington IP Consulting Co., Ltd.

(57) ABSTRACT

A network configuration system based on location of the device transmits a transient network configuration via a server to a node to set the network configuration thereof. Link layer discovery protocol (LLDP) information produced at the node is used to search for a default network management table in order to obtain the actual network configuration. The network configuration of the node is then updated according to the actual network configuration. The corresponding configuration method is also proposed. The mechanism helps improve the convenience in setting the network configuration.

12 Claims, 8 Drawing Sheets

| Node info. | Network port no. | IP address |
|---|---|---|
| 192.168.1.254 | 1 | 192.168.1.11 |
| 192.168.1.11 | 1 | 192.168.1.12 |
| 192.168.1.11 | 2 | 192.168.1.13 |
| 192.168.1.11 | 3 | 192.168.1.254 |
| 192.168.1.12 | 1 | 192.168.1.14 |
| 192.168.1.12 | 2 | 192.168.1.11 |
| 192.168.1.13 | 1 | 192.168.1.11 |
| 192.168.1.13 | 2 | 192.168.1.14 |
| 192.168.1.13 | 3 | 192.168.1.31 |
| 192.168.1.14 | 1 | 192.168.1.13 |
| 192.168.1.14 | 2 | 192.168.1.12 |
| 192.168.1.31 | 1 | 192.168.1.13 |

| Network port no. | IP address | MAC address |
|---|---|---|
| 1 | 192.168.1.12 | 00:01:02:03:04:05 |
| 2 | 192.168.1.13 | 00:0a:0b:0c:0d:0e |
| 3 | 192.168.1.254 | 00:01:0a:02:0b:03 |

FIG. 4A

| Network port no. | IP address | MAC address |
|---|---|---|
| 1 | 192.168.1.12 | 00:01:02:03:04:05 |
| 2 | 10.0.0.5 | 00:ea:eb:ec:ed:ee |
| 3 | 192.168.1.254 | 00:01:0a:02:0b:03 |

NETWORK CONFIGURATION SYSTEM BASED ON LOCATION AND CONFIGURATION METHOD THEREOF

BACKGROUND

1. Technical Field

The invention relates to a network configuration system and, in particular, to a network configuration system that determines network configuration according to the location of the device in the actual network.

2. Related Art

With rapid developments in the Internet, the network environment has become complicated in recent years. It is thus an urgent issue for vendors to improve the convenience in network configuring.

Generally speaking, the conventional network configuration method is done manually or through Dynamic Host Configuration Protocol (DHCP). Nevertheless, it is inefficient and difficult to set the network configuration manually in the complicated network environment. The DHCP configuring method, on the other hand, has the problem that a node cannot use a designated network configuration including Internet Protocol (IP) address according to its location in the entire network without setting in advance. Therefore, the prior art has the inconvenience in setting network configurations.

In view of this, some vendors propose the method of secondary setting. A server first randomly selects a set of IP addresses to set the network configurations. Afterwards, network devices transmit identification information to the server for the server to reconfigure the network configurations of the devices accordingly. However, this method requires one to set identification information and the corresponding IP addresses beforehand. The server cannot automatically set the network configurations of network devices according to the locations of the devices in the network topology. Consequently, such a method still has the problem of inconvenience in network configuring.

In summary, the prior art always has the problem of inconvenience in network configuration setting. It is imperative to provide a solution.

SUMMARY

The invention discloses a network configuration system based on the locations of devices and the configuration method thereof.

The disclosed system includes: a server and a plurality of nodes. The server includes a storage module, a receiving module, a configuring module, and a searching module. The storage module stores in advance a network management table, which includes node information, network port numbers, and operational IP addresses. The receiving module receives configuration requests and link layer discovery protocol (LLDP) information. The configuring module transmits a transient network configuration according to the configuration request. When determining that the LLDP information changes, the searching module compares the source address of the LLDP information and the network port number therein with the node information and network port number in the network management table, thereby finding the compatible operational IP address. The operational IP address is sent as the actual network configuration. Each of the nodes includes: an initializing module, a processing module, and a setting module. The initializing module uses the LLDP to establish an address analyzing table and broadcasts a configuration request. After receiving the transient network configuration, the processing module sets the network configuration accordingly. After the network configuration is set, the address analyzing table is used to continuously generate and send the LLDP information to the server. After receiving the operational IP address, the setting module updates the network configuration accordingly.

The disclosed method is used in a network environment with a server and several nodes. The method includes the steps of: storing a network management table on the server, the network management table including node information, network port numbers, and IP addresses; having each node establish an address analyzing table via the LLDP and broadcasting a configuration request; transmitting a transient network configuration from the server to the nodes according to the configuration request; setting the network configuration of the node according to the transient network configuration and, after the network configuration is set, continuously generating and sending LLDP information according to the address analyzing table to the server; when the server determines that the LLDP information changes, comparing the source address of the LLDP information and the network port number therein with the node information and network port number in the network management table to find a compatible operational IP address and sending the operational IP address as the actual network configuration to the node; resetting the network configuration of the node according to the actual network configuration.

The disclosed system and method differ from the prior art in that the invention uses a server to configure a transient network configuration and set the network configuration of a node. The LLDP information produced by the node is used to look up the default network management table, thereby obtaining the actual network configuration. The actual network configuration is used to reset the network configuration of the node.

Through the above-mentioned mechanism, the invention achieves the goal of enhancing the convenience in network configuration. When a node device is replaced, it does not need configuring in advance.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

Before describing the network configuration system based on locations of devices and the method thereof, we first define terms used herein. The "configuration request" refers to the request packet asking the server about the network configuration. The server runs Dynamic Host Configuration Protocol (DHCP) and functions as a DHCP server. The network configuration includes: IP addresses, netmask addresses, gateway addresses, etc. In other words, both the configuration request and the network configuration belong to the conventional DHCP technology. The transient network configuration is the temporary network configuration during initialization of the invention.

Figure 1:
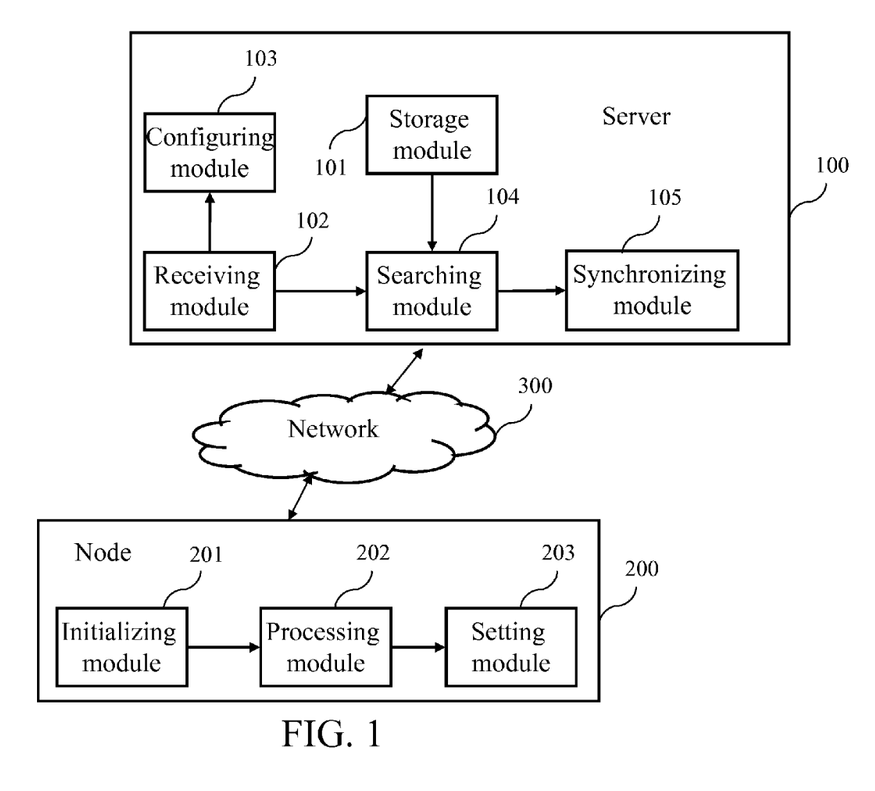
FIG. 1 is a system block diagram of the network configuration system based on the location of a device.

Please refer to FIG. 1, which is a system block diagram of the network configuration system based on the location of a device. The system contains: one server 100 and at least one node 200. The server 100 and the node 200 are connected via a network 300. The server 100 includes but not limited to embedded computers or network routers. The node 200 includes but not limited to Ethernet switches, IP cameras, multi-port serial servers, network I/O modules or wireless communication modules. In practice, the network 300 can be simply a wire connecting a server 100 and a node 200 or a network topology composed of multiple nodes, or a network formed through the connection of Ethernet switches. The server 100 includes: a storage module 101, a receiving module 102, a configuring module 103, and a searching module 104. The storage module 101 stores a network management table in advance. In practice, this network management table includes node information, network port numbers and operational IP addresses. For example, physical addresses are used to determine whether a device has been replaced. The network management table will be described in further detail with reference to accompany figures.

The receiving module 102 receives configuration requests and LLDP information. In practice, the configuration request is transmitted by broadcasting. The LLDP information is gathered and transmitted to the server via the network 300. Since the transmission method belongs to the prior art, it is not further described herein.

The configuring module 103 transmits a transient network configuration according to the configuration request. In practice, the configuring module 103 can be regarded as a DHCP server for processing packets related to the protocol and feedbacks, so that the transient network configuration is automatically configured for the node 200 to set the network configuration. After the node 200 completes the network configuration setting, packets are sent to the server 100 via the IP address. Since the configuration request and the transient network configuration have been defined before, they are not further described herein.

When the searching module 104 determines that the LLDP information is changed, the source address of the LLDP information and the network port number therein are compared with the node information and the network port number in the network management table, thereby finding the matched operational IP address. The matched operational IP address is transmitted as the actual network configuration. For example, suppose that the network management table has '192.168.1.254; 1; 192.168.1.11', there the semicolons divide the entry into the node information, the network port number and the operational IP address, respectively. When the source address of the LLDP information is '192.168.1.254' and it contains the network port number '1' corresponding to the changed physical address (or IP address), the searching module 104 will find the corresponding operational IP address '192.168.1.11'. Afterwards, the searching module 104 sets the operational IP address '192.168.1.11' as the actual network configuration to be sent to the corresponding node 200. For example, the LLDP information contains the changed IP address '10.X.X.X'. In practice, the searching module 104 determines whether the LLDP information is changed according to whether the IP addresses or physical addresses in the LLDP information sent before and after the same node are the same. Suppose the IP addresses or physical addresses in the LLDP information sent before and after the same node are different, then there is a change. Otherwise, there is no change.

It should be noted that the server 100 may further include a synchronizing module 105, so that in the presence of more than one server 100, the servers 100 can synchronize with one another the received LLDP. In this way, all the servers 100 can correctly know the entire network topology and which nodes 200 are configured with physical network configurations. This can avoid the situation where one server 100 has done the configuration, while another server 100 thinks that the configuration is not yet done. Such a redundancy function improves the reliability of the network configuration. Since the LLDP information synchronization belongs to conventional network technology, it is not repeated herein.

The node 200 includes: an initializing module 201, a processing module 202, and a setting module 203. The initializing module 201 establishes through LLDP the address analyzing table. Through the LLDP, one can obtain information of the devices directly connected to the node 200, such as the network port number, IP address, network status, and MAC address. Practically, the MAC address of the device directly connected with node 200 and the corresponding IP address can be recorded to establish the address analyzing table, which may even record the network port number at the same time. In addition, the initializing module 201 also broadcasts a configuration request, in order to obtain from the server 100 the transient network configuration for network configuration setting. Broadcasting is well-known in conventional network technology, and is not repeated herein.

After the processing module 202 receives the transient network configuration from the server 100, the transient network configuration is used to set the network configuration. The network configuration setting belongs to conventional DHCP technology, and is not repeated herein. After the completion of the network configuration, the address analyzing table established by the initializing module 201 is used to continuously generate the LLDP information (e.g., once every 30 seconds) to be sent to the server 100. This delivery method can be implemented through the Simple Network Management Protocol (SNMP). The generated LLDP information will be detailed later with reference to accompany diagrams. In practice, the node 200 can be considered as a DHCP client and an SNMP client. The server 100 is considered as a DHCP server and an SNMP server.

After the setting module 203 receives the actual network configuration from the server 100, the network configuration is updated accordingly. For example, suppose that the processing module 202 has completed the network configuration setting according to the transient network configuration, and its IP address is '10.0.0.5'. When the setting module 203 receives the actual network configuration as '192.168.1.22', it is used to reconfigure the network configuration. That is, the IP address of the node 200 will be reset from '10.0.0.5' to '192.168.1.22'.

Figure 2:
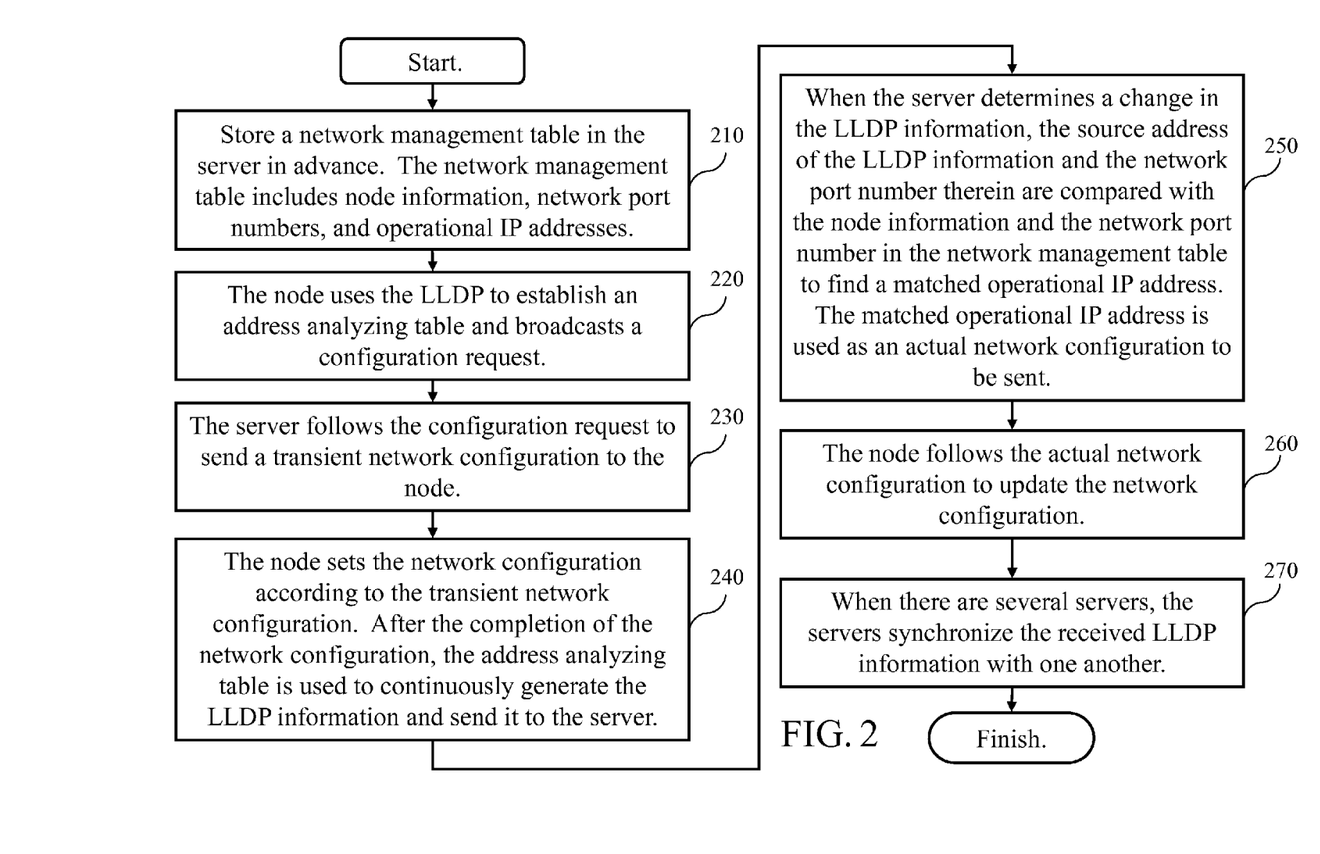
FIG. 2 is a flowchart of the network configuration method based on the location of a device.

Please refer to FIG. 2, which is a flowchart of the network configuration method based on the location of a device. The method comprises the steps of: storing a network management table in a server 100, with the network management table including node information, network port numbers, and IP addresses (step 210); using the LLDP to establish an address analyzing table at a node 200 and broadcasting a configuration request (step 220); transmitting a transient network configuration from the server 100 to the node according to the configuration request (step 230); setting the network configuration according to the transient network configuration at the node 200 and, after the completion of the network configuration, continuously generating the LLDP information according to the address analyzing table and send the LLDP information to the server 100 (step 240); when the server 100 determines that the LLDP has a change, comparing the source address of the LLDP information and the network port number therein with the node information in the network management table and the network port number thereof to find a matched operational IP address, and using the IP address as the actual network configuration to be sent to the node 200 (step 250); updating the network configuration of the node 200 according to the actual network configuration (step 260). Through the above steps, the server 100 sets the transient network configuration to set the network configuration of the node 200. The LLDP information generated by the node 200 is used to search a default network management table to obtain the actual network configuration. The actual network configuration is then used to reset the network configuration of the node 200. In addition, when the network topology has more than one server 100, the servers 100 can synchronize with one another the received LLDP information (step 270).

Figure 3A:
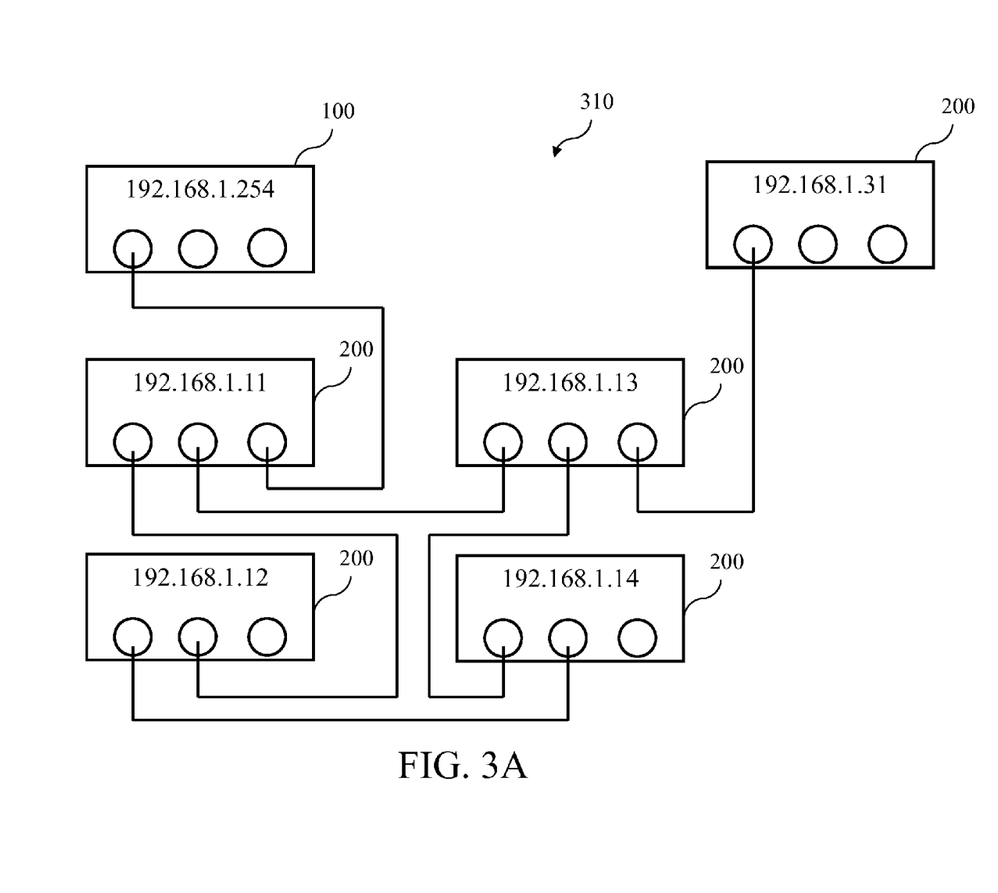
FIGS. 3A and 3B are schematic views of the disclosed network management table and the corresponding network topology.
Figure 3B:
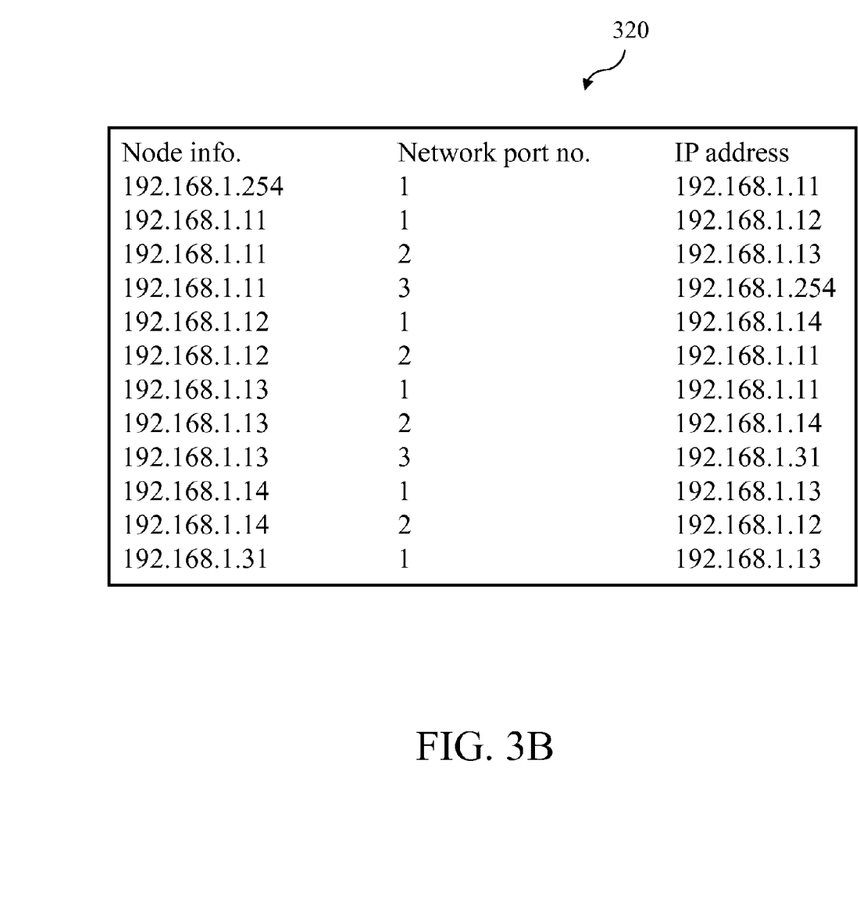

Please refer to FIGS. 3A to 5C for an embodiment of the invention. FIGS. 3A and 3B are schematic views of the disclosed network management table and the corresponding network topology. As mentioned before, the storage module 101 of the server 100 first stores a network management table that includes node information, network port numbers, and IP addresses. Take the network topology 310 shown in FIG. 3A as an example. The server 100 and the node 200 have different IP addresses (e.g., '192.168.1.254', '192.168.1.11', etc.) and three network connection ports (circles shown in FIG. 3A). The network port numbers of the network connection ports are respectively '1', '2', and '3' from left to right. The connections among the network connection ports are indicated by the lines in FIG. 3A. A user can follow this network topology 301 to establish the network management table 320 shown in FIG. 3B and store the network management table 320 in the server 100.

Figure 4A:
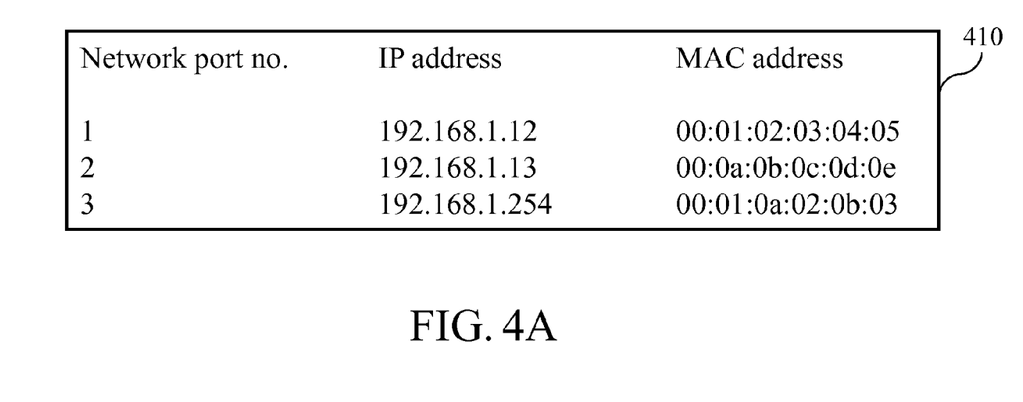
FIGS. 4A and 4B are schematic views of the LLDP information generated according to the invention.
Figure 4B:
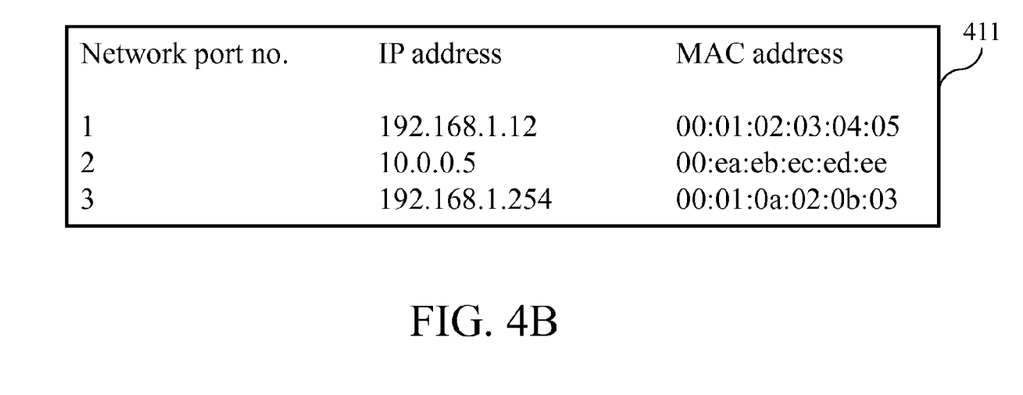

Please refer to FIGS. 4A and 4B, which are schematic views of the LLDP information generated according to the invention. As mentioned before, the processing module 202 of the node 200 follows the address analyzing table established by the initializing module 201 to continuously generate LLDP information. In practice, the address analyzing table records information of the devices directly connected with the node 200, such as network port numbers, IP addresses, MAC addresses, etc. Take the node 200 with the IP address of '192.168.1.11' in FIG. 3A as an example. According to the network port numbers, IP addresses, and MAC addresses recorded in the address analyzing table, the LLDP information 410 shown in FIG. 4A is produced. The LLDP information 410 is transmitted to the server 100. Suppose the node 200 with the IP address of '192.168.1.13' is replaced. Since different nodes 200 have to have different MAC addresses and the IP addresses are re-configured, the MAC address of the node 200 with the IP address of '192.168.1.11' changes inside the address analyzing table. The processing module 202 thus generates the LLDP information 411 shown in FIG. 4B. In practice, the LLDP can simply records network port numbers and IP addresses. When the IP address changes, the device is considered as being replaced.

Figure 5A:
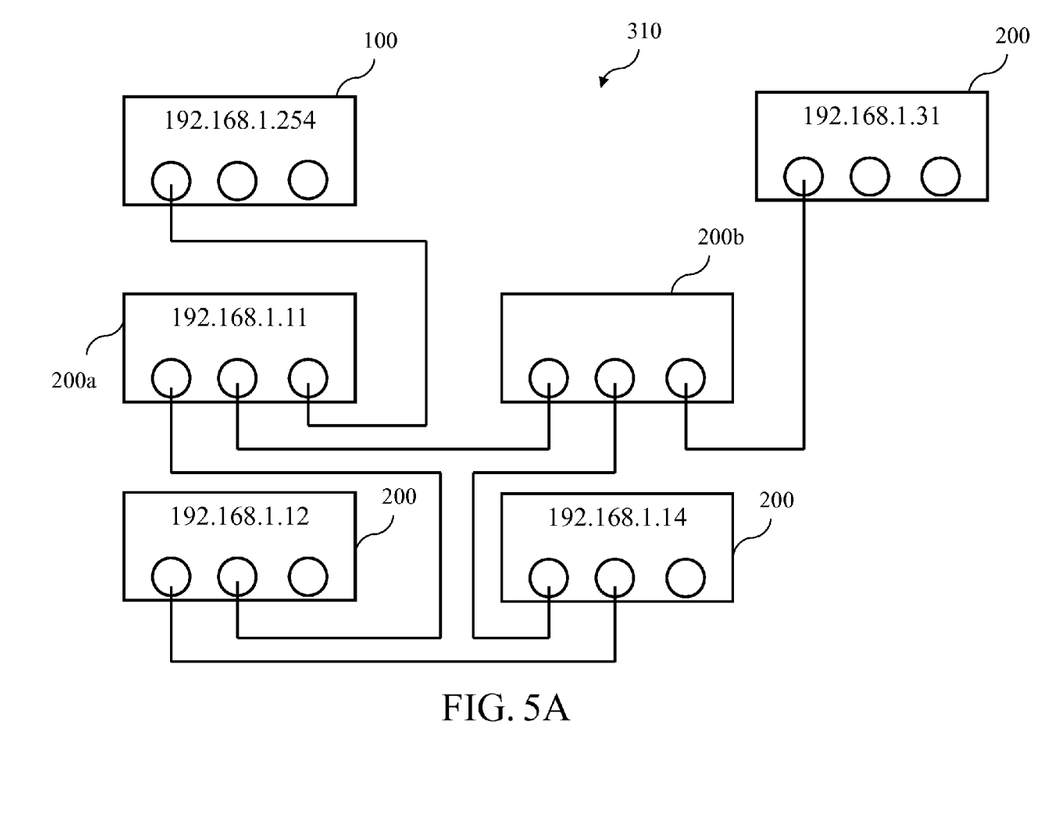
FIGS. 5A, 5B and 5C are schematic views of using the invention to set a network configuration according to the location of devices.
Figure 5B:
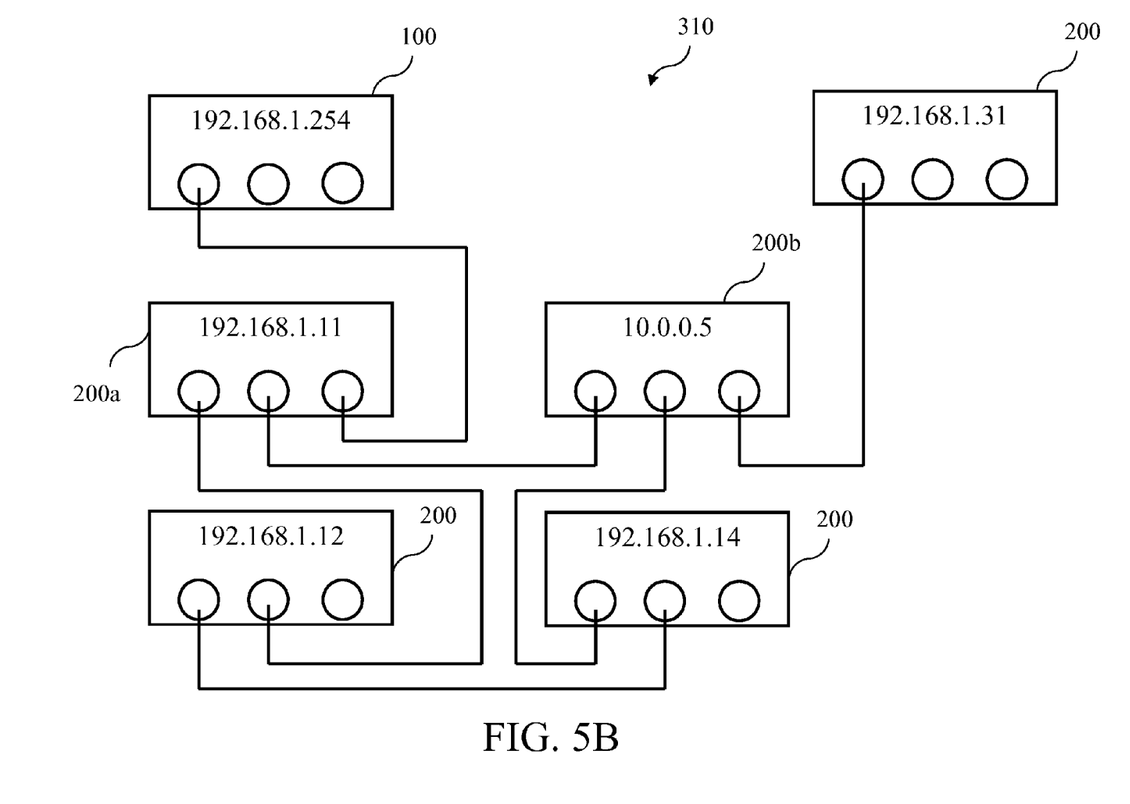
Figure 5C:
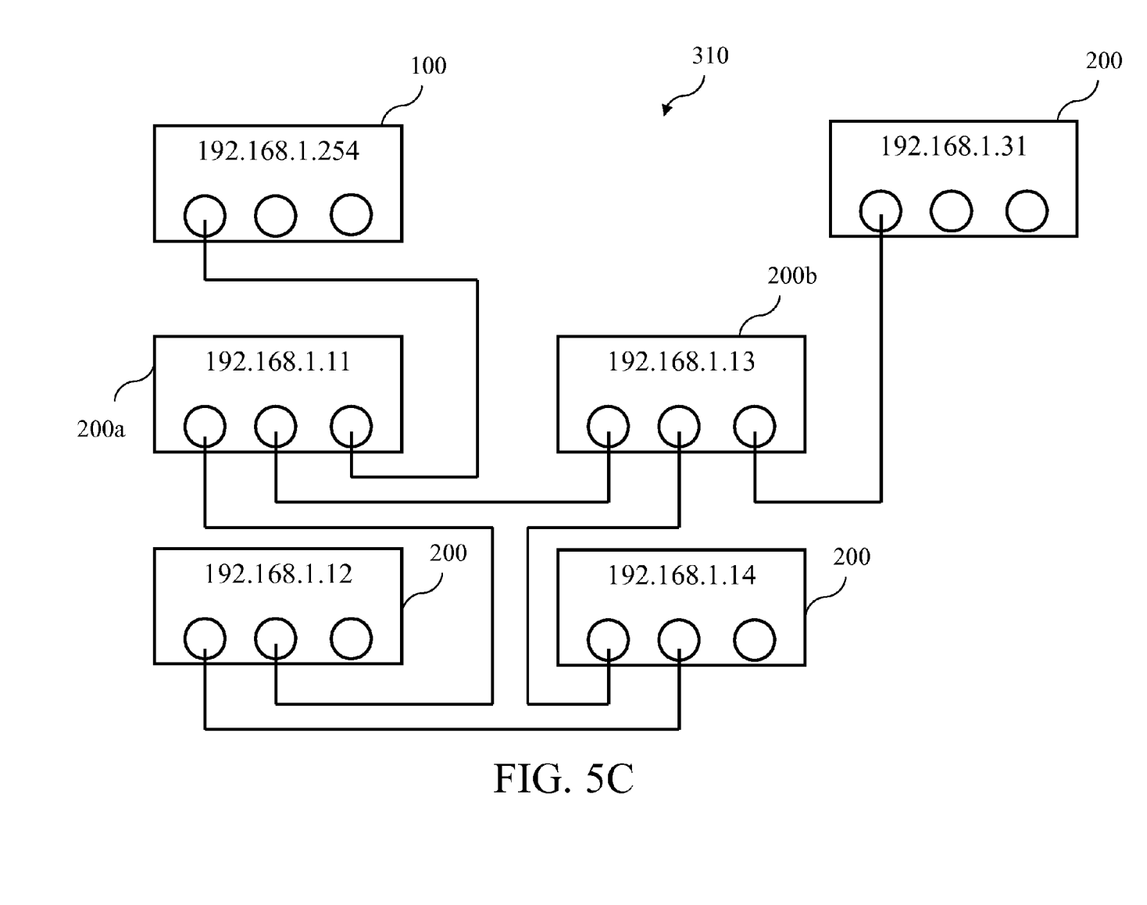

Please refer to FIGS. 5A to 5C and FIGS. 3A, 3B, and 4 at the same time. FIGS. 5A, 5B and 5C are schematic views of using the invention to set a network configuration according to the location of devices. When the node 200 with the IP address of '192.168.1.13' in the network topology 310 is broken, the user can replace it with the node 200*b* also using the invention, as shown in FIG. 5A. The connection scheme of the ports of the node 200*b* is unchanged. Since the node 200*b* is a newly replaced device, the network configuration is undefined. After the initialization of the node 200*b*, the node 200*b* uses the LLDP to obtain the information of adjacent network devices, such as the MAC address, IP address, and the corresponding network port numbers, and to broadcast a configuration request. After the server 100 receives the configuration request, a transient network configuration is sent to the node 200*b*. After the node 200*b* receives the transient network configuration, the transient network configuration is used to set the network configuration. After the completion of the network configuration, as shown in FIG. 5B, the node 200*b* has the IP address of '10.0.0.5'. Afterwards, the node 200*b* uses the IP address to transmit data with the server 100 and other nodes 200, 200*a*. After the completion of network configuration, the processing module 202 continues to generate the LLDP information according to the address analyzing table. Such information includes the IP addresses of the network devices adjacent to the node 200*b* and the corresponding network port numbers on the node 200*b*. The information is sent to the server 100.

The replacement of the node 200*b* results in a change in the MAC address of the node 200*a* in the address analyzing table. The LLDP information generated according to the address analyzing table also changes. After the server 100 receives the changed LLDP information 411, the server 100 knows that a device adjacent to the node 200*a* is replaced. In this case, the searching module 104 of the server 100 compares the source address of the LLDP information 411 and the network port number therein with the node information and network port number in the network management table, thereby finding a matched operational IP address. The matched operational IP address is used as the actual network configuration and sent to the node 200*b*. In this example, after the replacement of the node 200*b*, the node 200*a* generates the LLDP information as shown in FIG. 4B. Afterwards, the server 100 uses the source address '192.168.1.11' of the LLDP information 411 and the network port number '2' corresponding to the changed MAC address (or IP address) in the LLDP information 411 to find a matched operational IP address in the network management table 320. For example, the source address '192.168.1.11' is compared with the node information in the network management table 320. The network port number '2' is compared with the network port numbers in the network management table 320. After searching the network management table 320 shown in FIG. 3B, the server 100 obtains the matched operational IP address '192.168.1.13'. The matched operational IP address '192.168.1.13' is the actual network configuration and sent to the node 200*b*. The node 200*b* uses the actual network configuration sent from the server 100 to update the network configuration. The IP address of the node 200*b* is updated from '10.0.0.5' to '192.168.1.13', as shown in FIG. 5C. This completes the automatic network configuration based on the locations of devices. The network configuration of the node 200*b* is finally the same as the network configuration before the replacement.

In summary, the invention differs from the prior art in that the server configures the transient network configuration to set the network configuration of a node. The LLDP information generated by the node is used to search the default network management table in order to obtain the actual network configuration. The actual network configuration is used to reset the network configuration of the node. This technique solves the problems in the prior art and improves the convenience in network configurations.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A network configuration system based on the locations of devices, comprising:
   at least one server, each of which includes:
      a storage module for storing a network management table in advance, the network management table including node information, network port numbers, and operational IP addresses;
      a receiving module for receiving a configuration request and link layer discovery protocol (LLDP) information;
      a configuring module for sending a transient network configuration according to the configuration request; and
      a searching module for comparing the source address and network port number of the LLDP information with the node information and the network port numbers in the network management table when the LLDP information is determined to have a change, thereby finding a matched operational IP address, and using the matched operational IP address as an actual network configuration to be sent; and
   at least one node, each of which includes:
      an initializing module for establishing an address analyzing table through the LLDP and broadcasting the configuration request;
      a processing module for using the transient network configuration to set the network configuration after receiving the transient network configuration and, after the completion of the network configuration, continuously generating the LLDP information according to the address analyzing table and sending the LLDP information to the server; and
      a setting module for re-setting the network configuration according to the actual network configuration after receiving the actual network configuration.

2. The network configuration system based on the locations of devices of claim 1, wherein each of the servers further includes a synchronizing module for synchronizing the received LLDP information among one another.

3. The network configuration system based on the locations of devices of claim 1, wherein the transient network configuration and the actual network configuration include IP addresses, netmask addresses, and gateway addresses.

4. The network configuration system based on the locations of devices of claim 1, wherein the searching module determines a change in the LLDP information when the IP addresses or MAC addresses in the LLDP information sent from devices before and after the same node are different.

5. The network configuration system based on the locations of devices of claim 1, wherein the LLDP information includes network port numbers and the corresponding IP addresses, and the address analyzing table includes MAC addresses and the corresponding IP addresses.

6. The network configuration system based on the locations of devices of claim 1, wherein the server is but not limited to an embedded computer or network router.

7. The network configuration system based on the locations of devices of claim 1, wherein the node is but not limited to an Ethernet switch, network camera, multi-serial servers, network I/O module, or wireless communication module.

8. A network configuration method based on locations of devices used in a network environment with at least one server and at least one node, comprising the steps of:
   storing a network management table at the server in advance, the network management table including node information, network port numbers, and operational IP addresses;
   establishing an address analyzing table at the node through the LLDP and broadcasting a configuration request;
   sending a transient network configuration from the server to the node according to the configuration request;
   setting the network configuration of the node according to the transient network configuration and, after the completion of network configuration, continuously generating LLDP information according to the address analyzing table and sending the LLDP information to the server;
   comparing the source address and the network port number of the LLDP information with the node information and the network port numbers in the network management table when the server determines a change in the LLDP information to find a matched operational IP address, and using the matched operational IP address as an actual network configuration to be sent; and
   re-setting the network configuration of the node according to the actual network configuration.

9. The network configuration method based on locations of devices of claim 8 further comprising the step of synchronizing the LLDP information received by the servers.

10. The network configuration method based on locations of devices of claim 8, wherein the transient network configuration and the actual network configuration include IP addresses, netmask addresses, and gateway addresses.

11. The network configuration method based on locations of devices of claim 8, wherein the step of determining a change in the LLDP information is done by finding a difference between the IP addresses or MAC addresses in the LLDP information sent from devices before and after a node.

12. The network configuration method based on locations of devices of claim 8, wherein the LLDP information includes the network port number and the corresponding IP address, the address analyzing table includes the MAC address and the corresponding IP address.

* * * * *